United States Patent
Dong et al.

(10) Patent No.: US 12,247,138 B2
(45) Date of Patent: Mar. 11, 2025

(54) DEFOAMING COMPOSITION

(71) Applicant: JIANGSU SIXIN SCIENTIFIC-TECHNOLOGICAL APPLICATION RESEARCH INSTITUTE CO., LTD., Nanjing (CN)

(72) Inventors: Fei Dong, Nanjing (CN); Yuxi Han, Nanjing (CN); Anthony Kwabla Dotse, Nanjing (CN); Tian Cao, Nanjing (CN); Wei Huang, Nanjing (CN); Yang Liu, Nanjing (CN)

(73) Assignee: JIANGSU SIXIN SCIENTIFIC-TECHNOLOGICAL APPLICATION RESEARCH INSTITUTE CO., LTD., Nanjing (CN)

( * ) Notice: Subject to any disclaimer, the term of this patent is extended or adjusted under 35 U.S.C. 154(b) by 763 days.

(21) Appl. No.: 17/616,196

(22) PCT Filed: Jul. 8, 2019

(86) PCT No.: PCT/CN2019/094972
§ 371 (c)(1),
(2) Date: Dec. 3, 2021

(87) PCT Pub. No.: WO2020/244019
PCT Pub. Date: Dec. 10, 2020

(65) Prior Publication Data
US 2022/0325116 A1 Oct. 13, 2022

(30) Foreign Application Priority Data
Jun. 4, 2019 (CN) .......................... 201910481134.2

(51) Int. Cl.
C09D 7/65 (2018.01)
B01D 19/04 (2006.01)
C09D 15/00 (2006.01)

(52) U.S. Cl.
CPC ........... *C09D 7/65* (2018.01); *B01D 19/0409* (2013.01); *B01D 19/0472* (2013.01); *C09D 15/00* (2013.01)

(58) Field of Classification Search
CPC ................................................ B01D 19/0409
See application file for complete search history.

(56) References Cited

U.S. PATENT DOCUMENTS

| | | |
|---|---|---|
| 5,804,099 A | 9/1998 | Heilen et al. |
| 6,525,103 B2 | 2/2003 | Ebbrecht et al. |
| 6,686,320 B2 | 2/2004 | Ebbrecht et al. |
| 6,858,663 B2 | 2/2005 | Knott et al. |
| 8,735,524 B2 | 5/2014 | Lai et al. |
| 2003/0181602 A1* | 9/2003 | Ansmann ............... A61Q 19/00 525/418 |

FOREIGN PATENT DOCUMENTS

| | | | |
|---|---|---|---|
| CN | 1919936 A | 2/2007 | |
| CN | 101632908 A | 1/2010 | |
| CN | 101991975 A | 3/2011 | |
| CN | 102197065 A | 9/2011 | |
| CN | 102527096 A | 7/2012 | |
| CN | 103877753 A | 6/2014 | |
| CN | 106693450 A | 5/2017 | |
| CN | 107930187 A | 4/2018 | |
| CN | 109011720 A | 12/2018 | |
| CN | 110575786 A | * 12/2019 | ............ B01D 11/00 |
| IN | 106752267 A | 5/2017 | |

OTHER PUBLICATIONS

English machine translation of Wang et al. (CN 107930187) (Year: 2018).*
English machine translation of Wang (CN 109011720) (Year: 2018).*
Study on Application of Defoamer Agent in Waterborne Wood Paints, Beijing University of Chemical Technology, 2012, pp. 1-71.
Shi Liping, et al., Selection of Defoamers Applied in Waterborne Polyurethane Wood Varnish, Technology and Experience Exchange, 2003, pp. 46-48, China Academic Journal Electronic Publishing House.

* cited by examiner

*Primary Examiner* — Michael F Pepitone
(74) *Attorney, Agent, or Firm* — Bayramoglu Law Offices LLC

(57) ABSTRACT

A defoaming composition is composed of a composition E composed of a hydrogen bond donor polyether modified polysiloxane C and a hydrogen bond acceptor X, and a composition F composed of a hydrogen bond donor fatty alcohol polyether D and a hydrogen bond acceptor Y; and the polyether modified polysiloxane C is composed of a polyorganosiloxane A and an allyl polyether B. The general structural formula of the polyorganosiloxane A is $R^0{}_2HSiO(Me_2SiO)_aSiHR^0{}_2$, where $R^0$ is C1-12 alkyl, cycloalkyl or aryl, and a=10-100. The general structural formula of the allyl polyether B is $CH_2=CHCH_2(OCH_2CH_2)_b(OCH_2CHCH_3)_cOH$, where b=1-10, and c=10-100. The general structural formula of the fatty alcohol polyether D is $R^1(OCH_2CH_2)_m(OCH_2CHCH_3)_nOH$, where $R^1$ is C3-20 linear or branched alkyl, cycloalkyl or aralkyl; m=1-50; and n=10-100. The hydrogen bond acceptors X and Y are menthol, menthene, thymol, terpinelol, carveol or perillyl alcohol.

9 Claims, 1 Drawing Sheet

|    | Rating of the number of shrink holes |
| --- | --- |
| A0 | No shrink hole (shrink hole area is 0%) |
| A1 | Rare, several shrink holes (shrink hole area < 5%) |
| A2 | A small number of shrink holes (shrink hole area is 5%-10%) |
| A3 | A medium number of shrink holes (shrink hole area is 10%-30%) |
| A4 | A relatively large number of shrink holes (shrink hole area is 30%-50%) |
| A5 | Intensive shrink holes (shrink hole area > 50%) |

FIG. 1

| Sample Name | Results of High-Speed Dispersion Test (g/ml) | Judgement of Coating Performance | Gloss 60°(GU) |
| --- | --- | --- | --- |
| M1 | 0.9821 | A1 | 118 |
| M2 | 0.9956 | A1 | 117 |
| M3 | 0.9823 | A1 | 118 |
| M4 | 0.9605 | A1 | 119 |
| M5 | 0.9781 | A1 | 118 |
| M6 | 0.9876 | A1 | 118 |
| M7 | 0.9986 | A1 | 117 |
| N1 | 0.9353 | A1 | 118 |
| N2 | 0.9601 | A3 | 110 |
| N3 | 0.9345 | A2 | 113 |
| N4 | 0.9588 | A3 | 110 |
| N5 | 0.9210 | A3 | 106 |
| N6 | 0.9645 | A3 | 111 |
| N7 | 0.9642 | A3 | 110 |
| N8 | 0.9643 | A3 | 110 |
| N9 | 0.9340 | A1 | 85 |
| N10 | 0.9580 | A4 | 106 |

FIG. 2

DEFOAMING COMPOSITION

CROSS REFERENCE TO THE RELATED APPLICATIONS

This application is the national phase entry of International Application No. PCT/CN2019/094972, filed on Jul. 8, 2019, which is based upon and claims priority to Chinese Patent Application No. 201910481134.2, filed on Jun. 4, 2019, the entire contents of which are incorporated herein by reference.

TECHNICAL FIELD

The present invention relates to the technical field of fine chemical preparations, and in particular to a defoaming composition applicable to waterborne wood paint.

BACKGROUND

Wood coatings are an important part of the coating industry, and the coatings for wood paint furniture account for about 10% of the total consumption of coatings. Waterborne wood paint coatings are a kind of coatings taking water as a dispersion medium, and have the advantages such as noninflammability, no toxicity or no environmental pollution, and saving of energy and resources, thereby enjoying a broad application prospect.

Surfactants, such as a wetting agent, a dispersing agent, a surface slipping and leveling agent, a rheology modifier and low-molecular-weight components in a base material, contained in the waterborne wood paint per se promote and stabilize bubbles; and thus, the production and construction of the waterborne wood paint may introduce air and produce bubbles. Chemical reactions take place in the film forming processes of some resins, also leading to bubbles. In addition, in a coating process of the paint film, bubbles in the pores of the base material will be replaced out, thereby affecting the quality and appearance of the final coating. It can thus be seen that a constant attention needs to be paid to the timely elimination of foam and the compatibility of a defoamer in the production and construction of waterborne wood paint and even in a film drying process; and therefore, the selection of a defoamer is a key issue.

At present, among the public technical literature concerning defoamers for waterborne wood paint, the foreign patent U.S. Pat. No. 5,804,099A points out that polysiloxane or a polyoxyethylene-polyoxypropylene polymer used alone will affect the gloss and smoothness of the paint films of some high-gloss waterborne wood paint coatings; and the patent utilizes polyoxypropylene-polyoxyethylene modified polysiloxane, a nonionic surfactant and an inorganic solid substance to prepare a waterborne wood paint coating, improving the compatibility without affecting the gloss of the paint film. However, the defoaming and foam-inhibiting performance of the patent needs further improvement. In U.S. Pat. Nos. 6,858,663, 6,686,320, 6,525,103, a polyether chain link (EO, PO and BO prepared into special polyether) is subjected to a hydrosilylation reaction, to obtain polyether modified polysiloxane. The introduction of the epoxybutane BO enhances a foam elimination effect, but the compatibility thereof with the wood paint is relatively poor.

With respect to domestic literature, the *Study on Application of Defoamer Agent in Waterborne Wood Paints*, a master's thesis of Beijing University of Chemical Technology, points out that mineral oil in a mineral oil type defoamer will float to the surface of a paint film in a drying process of the paint film, reducing the gloss; and thus, the use of the mineral oil type defoamer should be avoided for high-gloss paint to the greatest extent. A piece of literature, *Selection of Defoamers Applied in Waterborne Polyurethane Wood Varnish* points out that the defoamers often used for waterborne wood paint are classified into mineral oil type defoamers, organic silicon type defoamers and organic polar compound type defoamers. The mineral oil type defoamers are widely applied in latex paint, with mineral oil as the main component and containing an absorbent (usually silicon dioxide) of surfactant molecules and a nonionic surfactant having an emulsification effect, and may cause some defects of the paint film, such as loss of gloss and darkness. With organic silicon resin as the main component, the organic silicon type defoamers, through direct use, will cause poor compatibility with the coating system; and the compatibility with the coating system is often improved through modification or emulsification of the organic silicon resin, so as to avoid shrink holes and fisheyes of the paint film. Containing low-HLB surfactants, some organic polymers poorly soluble in water and the like, the organic polar compound type defoamers have a slow defoaming speed; and the organic polymers poorly soluble in water will also lead to shrink holes and fisheyes.

With respect to domestic patents, there are no patents published specifically for defoamers for waterborne wood paint, and most patents are published for the patented technologies of defoamers for waterborne coatings. CN101991975A describes a method of adding fatty acid metal soap and fatty acid amide to prevent the fatty acid metal soap from appearing as a semi-colloidal elastomer, so as to solve the problem of dispersion; and also, the defoaming and foam-inhibiting performance needs to be improved. In CN106752267A, an organic silicon defoamer is synthesized using modified siloxane, modified polyether, organic silicon resin, white carbon black, an emulsifier, a surfactant and the like, and, when applied to coatings, has good defoaming and foam-inhibiting performance while the compatibility thereof needs to be improved. In CN106693450A, a defoamer for a waterborne coating is prepared using mineral oil, modified organic polyether, an emulsifier and a dispersant, with relatively good compatibility; but the mineral oil type defoamer will affect the gloss of waterborne wood paint.

To sum up, the defoamer for waterborne wood paint needs to meet the requirements for lasting defoaming and foam-inhibiting performance, good compatibility and no impact on the gloss of the paint film; the mineral oil type defoamers affect the gloss of the paint films, thereby limiting the use thereof in waterborne wood paint; the polyether type defoamers cannot meet the demand for the defoaming and foam-inhibiting performance; and the organic silicon type defoamers are very likely to cause shrink holes.

SUMMARY

In view of the above-mentioned problems, an objective of the present invention is to provide a defoaming composition that is prepared by introducing a hydrogen bond acceptor based on silicon polyether and polyether for a reaction to generate a new substance and meets the defoaming and foam-inhibiting performance while improving the compatibility with an application system.

To achieve the above purpose, the present invention adopts the following technical solution: a defoaming composition. The defoaming composition is composed of a composition E and a composition F; the composition E is composed of a hydrogen bond donor polyether modified polysiloxane C and a hydrogen bond acceptor X; the composition F is composed of a hydrogen bond donor fatty alcohol polyether D and a hydrogen bond acceptor Y; and the polyether modified polysiloxane C is composed of polyorganosiloxane A and allyl polyether B.

The general structural formula of the polyorganosiloxane A is:

$$R^0{}_2HSiO(Me_2SiO)_aSiHR^0{}_2$$

where the substituent $R^0$ is alkyl, cycloalkyl or aryl with 1-12 carbon atoms, and the subscript a is an integer between 10 and 100.

The general structural formula of the allyl polyether B is:

$$CH_2=CHCH_2(OCH_2CH_2)_b(OCH_2CHCH_3)_cOH$$

where b is an integer between 1 and 10, and c is an integer between 10 and 100.

The general structural formula of the fatty alcohol polyether D is:

$$R^1(OCH_2CH_2)_m(OCH_2CHCH_3)_nOH$$

where $R^1$ is linear or branched alkyl, cycloalkyl or aralkyl with 3-20 carbon atoms; m is an integer between 1 and 50; and n is an integer between 10 and 100.

The hydrogen bond acceptor X and the hydrogen bond acceptor Y are both selected from menthol, menthene, thymol, terpilenol, carveol and perillyl alcohol.

The polyorganosiloxane A is terminal hydrogen-containing polyorganosiloxane A.

When the substituent $R^0$ in the polyorganosiloxane A is alkyl, $R^0$ is one of methyl, ethyl, n-propyl, n-butyl, isobutyl, n-amyl, n-hexyl, n-heptyl, n-octyl, isooctyl, n-nonyl, n-decyl and n-dodecyl; when the substituent $R^0$ in the polyorganosiloxane A is cycloalkyl, $R^0$ is cyclopentyl or cyclohexyl ethyl; when the substituent $R^0$ in the polyorganosiloxane A is aryl, $R^0$ is one of phenyl, phenylmethyl, phenylethyl and 2-phenylpropyl, wherein preferably, $R^0$ is methyl.

In the defoaming composition of the present invention, a usage of the polyorganosiloxane A accounts for 10-32% of a total mass of the defoaming composition; a usage of the allyl polyether B accounts for 5-18% of the total mass of the defoaming composition; a usage of the fatty alcohol polyether D accounts for 50-83% of the total mass of the defoaming composition; the hydrogen bond acceptor X accounts for 0.5-5% of the total mass of the defoaming composition; and the hydrogen bond acceptor Y accounts for 0.5-5% of the total mass of the defoaming composition.

The defoaming composition of the present invention comprises a catalyst, the catalyst being selected from one of a platinum-alcohol complex, a platinum-alkene complex, a platinum-alkoxide complex, a platinum-ether complex, a platinum-ketone complex, an isopropyl alcohol chloroplatinate solution and a platinum-vinyl complex; a usage of the catalyst is 3-20 ppm of the total mass of the polyorganosiloxane A, based on platinum; and the catalyst is preferably an isopropyl alcohol chloroplatinate solution.

A use of the defoaming composition in a form of an additive in the field of waterborne wood paint.

A preparation method of the defoaming composition, comprising:
1) putting polyorganosiloxane A and allyl polyether B as well as a catalyst into a reaction vessel, heating to 60-140° C. and stirring, and preserving heat for 0.5-1.5 h, to obtain polyether modified polysiloxane C;
2) mixing the polyether modified polysiloxane C and a hydrogen bond acceptor X and putting into a reaction vessel, stirring at 25° C.-100° C., and preserving heat until the system is transparent and clear, marked as a composition E;
3) mixing fatty alcohol polyether D and a hydrogen bond acceptor Y and putting into a reaction vessel, stirring at 25° C.-100° C., and preserving heat until the system is transparent and clear, marked as a composition F; and
4) mixing the composition E and the composition F, and stirring well, to obtain a defoaming composition M.

Advantages of the present invention are as follows:
1. The defoaming and foam-inhibiting performance of the defoaming composition in the waterborne wood paint system is improved by introducing oleophilic groups -($Me_2SiO$)— and —($OCH_2CHCH_3$)— into the polyether modified polysiloxane C;
2. The dispersion performance of the defoaming composition in the waterborne wood paint system is improved by introducing a hydrophilic group —($OCH_2CH_2$)— into the fatty alcohol polyether D, so as to improve the compatibility;
3. Given the poor compatibility between the oleophilic polyether modified polysiloxane C and the hydrophilic fatty alcohol polyether D in the present invention, the hydrogen bond acceptors are introduced so that the oleophilic polyether modified polysiloxane C and the hydrophilic fatty alcohol polyether D are combined with the hydrogen bond acceptors respectively to form new compositions E and F; and the composition E and the composition F can be combined through the remaining hydrogen bonds in a mixing process so that the mixing is more uniform and a performance enhancing effect is realized.

BRIEF DESCRIPTION OF THE DRAWINGS

FIG. 1 is a shrink hole rating standard in a high-speed dispersion test experiment; and FIG. 2 shows the test results of high-speed dispersion and coating performance in an embodiment.

DETAILED DESCRIPTION OF THE EMBODIMENTS

The present invention is further described below with reference to the accompanying drawings and specific implementations.

Embodiment 1: 16 g of terminal hydrogen-containing polyorganosiloxane $Me_2HSiO(Me_2SiO)_{55}SiHMe_2$, 11 g of allyl polyether $CH_2=CHCH_2(OCH_2CH_2)_5(OCH_2CHCH_3)_{55}OH$ and 10 ppm of an isopropyl alcohol chloroplatinate solution (based on platinum) were put into a reaction vessel, heated to 110° C. and stirred, and the heat was preserved for 1.0 h, to obtain polyether modified polysiloxane C1; the polyether modified polysiloxane C1 and 3 g of menthol were mixed and put into a reaction vessel and stirred at 60° C., and the heat was preserved until the system is transparent and clear, to obtain a composition E1; 67 g of fatty alcohol polyether $C_{12}H_{25}(OCH_2CH_2)_{25}(OCH_2CHCH_3)_{55}OH$ and 3 g of menthol were mixed and put into a reaction vessel and stirred at 60° C., and the heat was preserved until the system is transparent and clear, marked as a composition F1; and the composition E1 and the composition F1 were mixed and stirred well to obtain a defoaming composition M1.

Embodiment 2: 32 g of terminal hydrogen-containing polyorganosiloxane $Me_2HSiO(Me_2SiO)_{100}SiHMe_2$, 8 g of allyl polyether $CH_2=CHCH_2(OCH_2CH_2)_1(OCH_2CHCH_3)_{10}OH$ and 20 ppm of an isopropyl alcohol chloroplatinate solution (based on platinum) were put into a reaction vessel, heated to 60° C. and stirred, and the heat was preserved for 1.5 h, to obtain polyether modified polysiloxane C2; the polyether modified polysiloxane C2 and 5 g of thymol were mixed and put into a reaction vessel and stirred at 100° C., and the heat was preserved until the system is transparent and clear, to obtain a composition E2; 50 g of fatty alcohol polyether $C_{20}H_{41}(OCH_2CH_2)_{50}(OCH_2CHCH_3)_{100}OH$ and 5 g of terpilenol were mixed and put into a reaction vessel and stirred at 100° C., and the heat was preserved until the system is transparent and clear, marked as a composition F2; and the composition E2 and the composition F2 were mixed and stirred well to obtain a defoaming composition M2.

Embodiment 3: 10 g of terminal hydrogen-containing polyorganosiloxane $Me_2HSiO(Me_2SiO)_{10}SiHMe_2$, 18 g of allyl polyether $CH_2=CHCH_2(OCH_2CH_2)_{10}(OCH_2CHCH_3)_{100}OH$ and 3 ppm of an isopropyl alcohol chloroplatinate solution (based on platinum) were put into a reaction vessel, heated to 140° C. and stirred, and the heat was preserved for 1.0 h, to obtain polyether modified polysiloxane C3; the polyether modified polysiloxane C3 and 0.5 g of menthene were mixed and put into a reaction vessel and stirred at room temperature, and the heat was preserved until the system is transparent and clear, to obtain a composition E3; 71 g of fatty alcohol polyether $C_3H_7(OCH_2CH_2)(OCH_2CHCH_3)_{10}OH$ and 0.5 g of carveol were mixed and put into a reaction vessel and stirred at 25° C., and the heat was preserved until the system is transparent and clear, marked as a composition F3; and the composition E3 and the composition F3 were mixed and stirred well to obtain a defoaming composition M3.

Embodiment 4: 10 g of terminal hydrogen-containing polyorganosiloxane $Me_2HSiO(Me_2SiO)_{68}SiHMe_2$, 5 g of allyl polyether $CH_2=CHCH_2(OCH_2CH_2)_6(OCH_2CHCH_3)_{60}OH$ and 7 ppm of an isopropyl alcohol chloroplatinate solution (based on platinum) were put into a reaction vessel, heated to 120° C. and stirred, and the heat was preserved for 0.5 h, to obtain polyether modified polysiloxane C4; the polyether modified polysiloxane C4 and 1 g of menthene were mixed and put into a reaction vessel and stirred at 50° C., and the heat was preserved until the system is transparent and clear, to obtain a composition E4; 83 g of fatty alcohol polyether $C_8H_{15}(OCH_2CH_2)_{30}(OCH_2CHCH_3)_{70}OH$ and 1 g of perillyl alcohol were mixed and put into a reaction vessel and stirred at 50° C., and the heat was preserved until the system is transparent and clear, marked as a composition F4; and the composition E4 and the composition F4 were mixed and stirred well to obtain a defoaming composition M4.

Embodiment 5: 12 g of terminal hydrogen-containing polyorganosiloxane $Me_2HSiO(Me_2SiO)_{40}SiHMe_2$, 12 g of allyl polyether $CH_2=CHCH_2(OCH_2CH_2)_4(OCH_2CHCH_3)_{50}OH$ and 12 ppm of an isopropyl alcohol chloroplatinate solution (based on platinum) were put into a reaction vessel, heated to 100° C. and stirred, and the heat was preserved for 0.5 h, to obtain polyether modified polysiloxane C5; the polyether modified polysiloxane C5 and 2 g of thymol were mixed and put into a reaction vessel and stirred at 70° C., and the heat was preserved until the system is transparent and clear, to obtain a composition E5; 70 g of fatty alcohol polyether $C_6H_{13}(OCH_2CH_2)_{25}(OCH_2CHCH_3)_{55}OH$ and 4 g of menthene were mixed and put into a reaction vessel and stirred at 40° C., and the heat was preserved until the system is transparent and clear, marked as a composition F5; and the composition E5 and the composition F5 were mixed and stirred well to obtain a defoaming composition M5.

Embodiment 6: 20 g of terminal hydrogen-containing polyorganosiloxane $Me_2HSiO(Me_2SiO)_{80}SiHMe_2$, 10 g of allyl polyether $CH_2=CHCH_2(OCH_2CH_2)_5(OCH_2CHCH_3)_{70}OH$ and 9 ppm of an isopropyl alcohol chloroplatinate solution (based on platinum) were put into a reaction vessel, heated to 90° C. and stirred, and the heat was preserved for 0.5 h, to obtain polyether modified polysiloxane C6; the polyether modified polysiloxane C6 and 4 g of perillyl alcohol were mixed and put into a reaction vessel and stirred at 80° C., and the heat was preserved until the system is transparent and clear, to obtain a composition E6; 62 g of fatty alcohol polyether $C_{14}H_{29}(OCH_2CH_2)_{20}(OCH_2CHCH_3)_{60}OH$ and 4 g of menthene were mixed and put into a reaction vessel and stirred at 40° C., and the heat was preserved until the system is transparent and clear, marked as a composition F6; and the composition E6 and the composition F6 were mixed and stirred well to obtain a defoaming composition M6.

Embodiment 7: 26 g of terminal hydrogen-containing polyorganosiloxane $Me_2HSiO(Me_2SiO)_{40}SiHMe_2$, 16 g of allyl polyether $CH_2=CHCH_2(OCH_2CH_2)_8(OCH_2CHCH_3)_{30}OH$ and 16 ppm of an isopropyl alcohol chloroplatinate solution (based on platinum) were put into a reaction vessel, heated to 130° C. and stirred, and the heat was preserved for 0.5 h, to obtain polyether modified polysiloxane C7; the polyether modified polysiloxane C7 and 2 g of terpilenol were mixed and put into a reaction vessel and stirred at 40° C., and the heat was preserved until the system is transparent and clear, to obtain a composition E7; 55 g of fatty alcohol polyether $C_6H_{13}(OCH_2CH_2)_{40}(OCH_2CHCH_3)_{80}OH$ and 1 g of thymol were mixed and put into a reaction vessel and stirred at 40° C., and the heat was preserved until the system is transparent and clear, marked as a composition F7; and the composition E7 and the composition F7 were mixed and stirred well to obtain a defoaming composition M7.

Comparative Example 1

27 g of fatty alcohol polyether $C_{12}H_{25}(OCH_2CH_2)_{25}(OCH_2CHCH_3)_{55}OH$ and 3 g of menthol were mixed and put into a reaction vessel and stirred at 60° C., and the heat was preserved until the system is transparent and clear, to obtain a composition E8; 67 g of fatty alcohol polyether $C_{12}H_{25}(OCH_2CH_2)_{25}(OCH_2CHCH_3)_{55}OH$ and 3 g of menthol were mixed and put into a reaction vessel and stirred at 60° C., and the heat was preserved until the system is transparent and clear, marked as a composition F1; and the composition E8 and the composition F1 were mixed and stirred well to obtain a defoaming composition N1.

Comparative Example 2

32 g of terminal hydrogen-containing polyorganosiloxane $Me_2HSiO(Me_2SiO)_{100}SiHMe_2$, 8 g of allyl polyether $CH_2=CHCH_2(OCH_2CH_2)_1(OCH_2CHCH_3)_{10}OH$ and 20 ppm of an isopropyl alcohol chloroplatinate solution (based on platinum) were put into a reaction vessel, heated to 60° C. and stirred, and the heat was preserved for 1.5 h, to obtain polyether modified polysiloxane C2; the polyether modified polysiloxane C2 and 5 g of thymol were mixed and put into a reaction vessel and stirred at 100° C., and the heat was preserved until the system is transparent and clear, to obtain a composition E2; 50 g of the polyether modified polysiloxane C2 and 5 g of terpilenol were mixed and put into a reaction vessel and stirred at 100° C., and the heat was preserved until the system is transparent and clear, marked as a composition F8; and the composition E2 and the composition F8 were mixed and stirred well to obtain a defoaming composition N2.

Comparative Example 3

95 g of fatty alcohol polyether $C_3H_7(OCH_2CH_2)(OCH_2CHCH_3)_{10}OH$ and 5 g of carveol were mixed and put into a reaction vessel and stirred at 25° C., and the heat was preserved until the system is transparent and clear, to obtain a defoaming composition N3.

Comparative Example 4

53 g of terminal hydrogen-containing polyorganosiloxane $Me_2HSiO(Me_2SiO)_{68}SiHMe_2$, 37 g of allyl polyether $CH_2=CHCH_2(OCH_2CH_2)_6(OCH_2CHCH_3)_{60}OH$ and 7 ppm of an isopropyl alcohol chloroplatinate solution (based on platinum) were put into a reaction vessel, heated to 120° C. and stirred, and the heat was preserved for 0.5 h, to obtain polyether modified polysiloxane C8; the polyether modified polysiloxane C8 and 10 g of menthene were mixed and put into a reaction vessel and stirred at 50° C., and the heat was preserved until the system is transparent and clear, to obtain a defoaming composition N4.

Comparative Example 5

12 g of terminal hydrogen-containing polyorganosiloxane $Me_2HSiO(Me_2SiO)_{40}SiHMe_2$, 12 g of allyl polyether $CH_2=CHCH_2(OCH_2CH_2)_4(OCH_2CHCH_3)_{55}OH$ and 12 ppm of an isopropyl alcohol chloroplatinate solution (based on platinum) were put into a reaction vessel, heated to 100° C. and stirred, and the heat was preserved for 0.5 h, to obtain polyether modified polysiloxane C5; the polyether modified polysiloxane C5 and 76 g of fatty alcohol polyether $C_6H_{13}(OCH_2CH_2)_{25}(OCH_2CHCH_3)_{55}OH$ were mixed and put into a reaction vessel and stirred well at 40° C., to obtain a defoaming composition N5.

Comparative Example 6

26 g of terminal hydrogen-containing polyorganosiloxane $Me_2HSiO(Me_2SiO)_{40}SiHMe_2$, 16 g of allyl polyether $CH_2=CHCH_2(OCH_2CH_2)_8(OCH_2CHCH_3)_{30}OH$ and 16 ppm of an isopropyl alcohol chloroplatinate solution (based on platinum) were put into a reaction vessel, heated to 130° C. and stirred, and the heat was preserved for 0.5 h, to obtain polyether modified polysiloxane C7; the polyether modified polysiloxane C7 and 2 g of $CH_3-CO-NH-CH_3$ were mixed and put into a reaction vessel and stirred at 40° C., and the heat was preserved until the system is transparent and clear, to obtain a composition E9; 55 g of fatty alcohol polyether $C_6H_{13}(OCH_2CH_2)_{40}(OCH_2CHCH_3)_{80}OH$ and 1 g of $CH_3-CO-NH-CH_3$ were mixed and put into a reaction vessel and stirred at 40° C., and the heat was preserved until the system is transparent and clear, marked as a composition F9; and the composition E9 and the composition F9 were mixed well, to obtain a defoaming composition N6.

Comparative Example 7

16 g of terminal hydrogen-containing polyorganosiloxane $Me_2HSiO(Me_2SiO)_{55}SiHMe_2$, 11 g of allyl polyether $CH_2=CHCH_2(OCH_2CH_2)_5(OCH_2CHCH_3)_{55}OH$ and 10 ppm of an isopropyl alcohol chloroplatinate solution (based on platinum) were put into a reaction vessel, heated to 110° C. and stirred, and the heat was preserved for 1.0 h, to obtain polyether modified polysiloxane C1; the polyether modified polysiloxane C1 and 3 g of choline chloride were mixed and put into a reaction vessel and stirred at 60° C., and the heat was preserved until the system is transparent and clear, to obtain a composition E10; 67 g of fatty alcohol polyether $C_{12}H_{25}(OCH_2CH_2)_{25}(OCH_2CHCH_3)_{55}OH$ and 3 g of menthol were mixed and put into a reaction vessel and stirred at 60° C., and the heat was preserved until the system is transparent and clear, marked as a composition F1; and the composition E10 and the composition F1 were mixed and stirred well, to obtain a defoaming composition N7.

Comparative Example 8

16 g of terminal hydrogen-containing polyorganosiloxane $Me_2HSiO(Me_2SiO)_{55}SiHMe_2$, 11 g of allyl polyether $CH_2=CHCH_2(OCH_2CH_2)_5(OCH_2CHCH_3)_{55}OH$ and 10 ppm of an isopropyl alcohol chloroplatinate solution (based on platinum) were put into a reaction vessel, heated to 110° C. and stirred, and the heat was preserved for 1.0 h, to obtain polyether modified polysiloxane C1; the polyether modified polysiloxane C1 and 3 g of menthol were mixed and put into a reaction vessel and stirred at 60° C., and the heat was preserved until the system is transparent and clear, to obtain a composition E1; 67 g of fatty alcohol polyether $C_{12}H_{25}(OCH_2CH_2)_{25}(OCH_2CHCH_3)_{55}OH$ and 3 g of choline chloride were mixed and put into a reaction vessel and stirred at 60° C., and the heat was preserved until the system is transparent and clear, to obtain a composition F10; and the composition E1 and the composition F10 were mixed and stirred well, to obtain a defoaming composition N8.

Comparative Example 9

A defoamer N9 was prepared according to Embodiment 1 in the patent CN106693450A.

Comparative Example 10

A defoamer N10 was prepared according to Embodiment 1 in the patent CN106752267A.

Performance Test on Defoamer Composition (1) High-speed dispersion test: a test was carried out by using waterborne wood paint as a foaming medium and adopting a high-speed dispersion method: 100 g of waterborne wood paint was weighed with a cleaned stainless-steel cup, and 0.3 g of a defoamer was added. The mixture was subjected to high-speed dispersion for 5 min at a speed of 1,000 rpm, and then immediately poured into a 100 ml graduated cylinder; the weight and volume of the waterborne wood paint were recorded; and a specific gravity was calculated. A greater value of the specific gravity indicates a lower air content and a better defoaming and foam-inhibiting performance of the defoamer.

(2) Judgment of coating performance: the waterborne wood paint after the high-speed dispersion was put aside for 15 min; a certain amount of the waterborne wood paint was taken out from the bottom and allowed to stand on a clean glass plate, and scraped flat by a wet film preparation device; and the status (shrink hole conditions) of the waterborne wood paint on the glass plate was observed. The results are judged as FIGS. 1 and 2; and fewer shrink holes indicate better compatibility.

(3) Gloss test on the paint film: the coated glass plate was subjected to a gloss test using a 60° gloss meter; measurement was carried out at three different positions of the glass plate; and the result was recorded as the arithmetic mean of the readings at the three points while the surface conditions of the paint film were observed. A higher gloss value indicates a paint film with a better fullness.

It should be noted that, the above are only preferred embodiments of the present invention and are not intended to limit the protection scope of the present invention. Any combination or equivalent replacement based on the above embodiments shall be included in the protection scope of the present invention.

What is claimed is:

1. A defoaming composition, comprising a first composition and a second composition, wherein
   the first composition comprises a first hydrogen bond donor and a first hydrogen bond acceptor, wherein the first hydrogen bond donor is a polyether modified polysiloxane;
   the second composition comprises a second hydrogen bond donor and a second hydrogen bond acceptor, wherein the second hydrogen bond donor is a fatty alcohol polyether;
   the polyether modified polysiloxane comprises a polyorganosiloxane and an allyl polyether;
   a general structural formula of the polyorganosiloxane is:

$R^0{}_2HSiO(Me_2SiO)_aSiHR^0{}_2$, wherein $R^0$ is alkyl, cycloalkyl or aryl with 1-12 carbon atoms, and a is an integer between 10 and 100;
   a general structural formula of the allyl polyether is:

$CH_2=CHCH_2(OCH_2CH_2)_b(OCH_2CHCH_3)_cOH$, wherein b is an integer between 1 and 10, and c is an integer between 10 and 100;
   a general structural formula of the fatty alcohol polyether is:

$R^1(OCH_2CH_2)_m(OCH_2CHCH_3)_nOH$, wherein $R^1$ is linear or branched alkyl, cycloalkyl or aralkyl with 3-20 carbon atoms; m is an integer between 1 and 50; and n is an integer between 10 and 100;
   the first hydrogen bond acceptor and the second hydrogen bond acceptor are both selected from the group consisting of menthol, menthene, thymol, terpilenol, carveol and perillyl alcohol; and wherein
   the polyorganosiloxane accounts for 10-32% of a total mass of the defoaming composition;
   the allyl polyether accounts for 5-18% of the total mass of the defoaming composition;
   the fatty alcohol polyether accounts for 50-83% of the total mass of the defoaming composition;
   the first hydrogen bond acceptor accounts for 0.5-5% of the total mass of the defoaming composition; and
   the second hydrogen bond acceptor accounts for 0.5-5% of the total mass of the defoaming composition.

2. The defoaming composition of claim 1, wherein when the $R^0$ in the polyorganosiloxane is alkyl, the $R^0$ is selected from the group consisting of methyl, ethyl, n-propyl, n-butyl, isobutyl, n-amyl, n-hexyl, n-heptyl, n-octyl, isooctyl, n-nonyl, n-decyl, and n-dodecyl.

3. The defoaming composition of claim 1, wherein when the $R^0$ in the polyorganosiloxane is cycloalkyl, the $R^0$ is cyclopentyl or cyclohexyl ethyl.

4. The defoaming composition of claim 1, wherein when the $R^0$ in the polyorganosiloxane is aryl, the $R^0$ is phenyl, phenylmethyl, phenylethyl, or 2-phenylpropyl.

5. The defoaming composition of claim 1, wherein the defoaming composition further comprises a catalyst,
   wherein the catalyst is selected from the group consisting of a platinum-alcohol complex, a platinum-alkene complex, a platinum-alkoxide complex, a platinum-ether complex, a platinum-ketone complex, an isopropyl alcohol chloroplatinate solution and a platinum-vinyl complex; and
   an amount of platinum in the catalyst is 3-20 ppm of a total mass of the polyorganosiloxane and the allyl polyether.

6. The defoaming composition of claim 5, wherein the catalyst is the isopropyl alcohol chloroplatinate solution.

7. A method of preparing a waterborne wood paint, comprising the step of using the defoaming composition of claim 1 as a defoaming aid in a form of an internal additive in the waterborne wood paint.

8. A preparation method of the defoaming composition of claim 1, comprising:
   1) putting a first reaction mixture of the polyorganosiloxane, the allyl polyether, and a catalyst into a first reaction vessel, heating the first reaction mixture to 60-140° C., and stirring, and preserving heat for 0.5-1.5 h to obtain the polyether modified polysiloxane;
   2) mixing the polyether modified polysiloxane and the first hydrogen bond acceptor into a second reaction mixture, and putting the second reaction mixture into a second reaction vessel, stirring the second reaction mixture at 25° C.-100° C., and preserving heat until the second reaction mixture is transparent and clear to obtain the first composition;
   3) mixing the fatty alcohol polyether and the second hydrogen bond acceptor into a third reaction mixture and putting the third reaction into a third reaction vessel, stirring the third reaction mixture at 25° C.-100° C., and preserving heat until the third reaction mixture is transparent and clear to obtain the second composition; and
   4) mixing the first composition and the second composition, and stirring, to obtain the defoaming composition.

9. The defoaming composition of claim 2, wherein the $R^0$ is methyl.

* * * * *